UNITED STATES PATENT OFFICE.

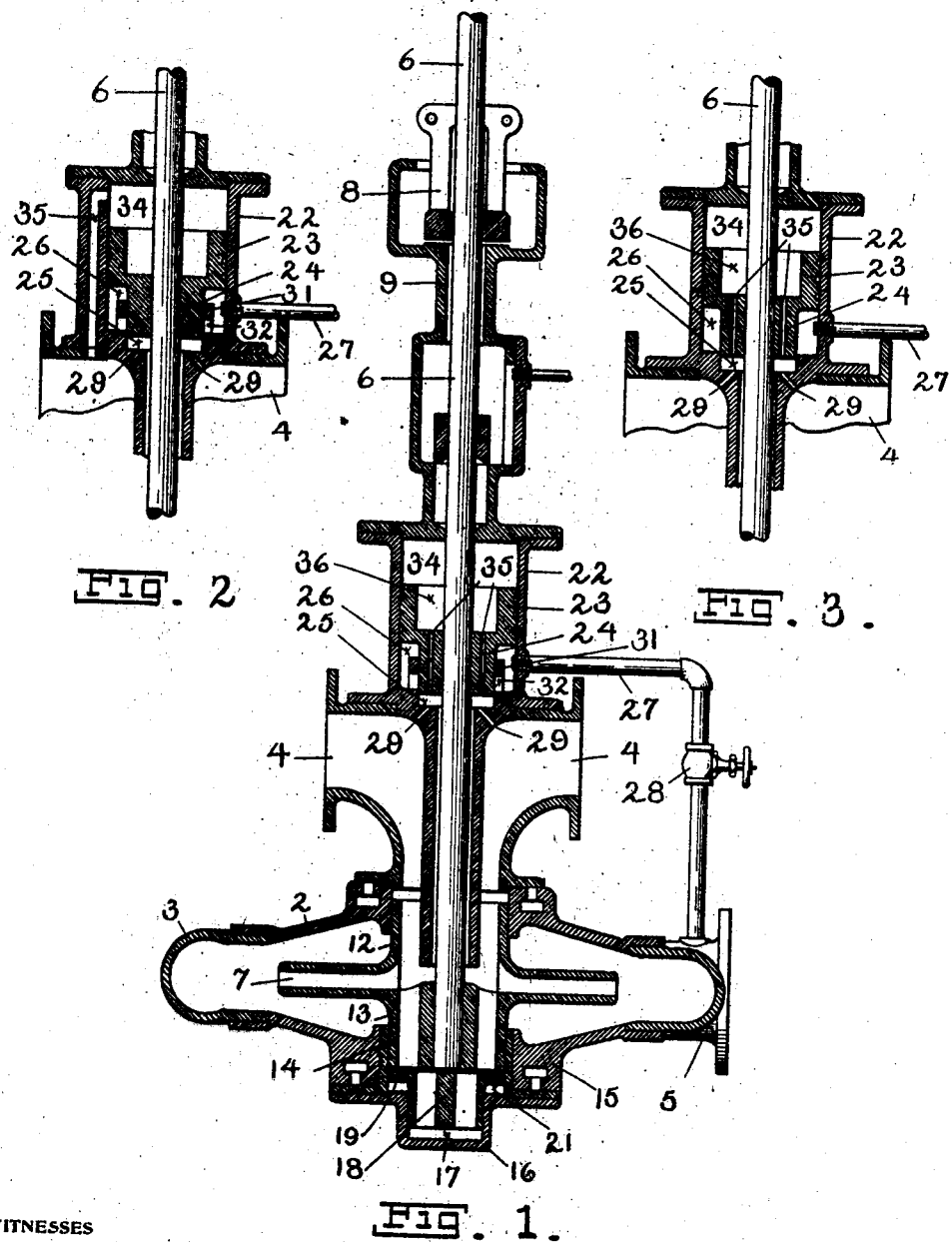

JOHN A. YEATMAN, OF OAKLAND, CALIFORNIA, ASSIGNOR TO UNITED IRON WORKS, OF OAKLAND, CALIFORNIA, A CORPORATION OF CALIFORNIA.

CENTRIFUGAL PUMP.

1,050,588.

Specification of Letters Patent. Patented Jan. 14, 1913.

Application filed December 26, 1911. Serial No. 667,758.

*To all whom it may concern:*

Be it known that I, JOHN A. YEATMAN, a citizen of the United States, and a resident of Oakland, in the county of Alameda and State of California, have invented certain new and useful Improvements in Centrifugal Pumps, of which the following is a specification.

The invention relates to vertical shaft centrifugal pumps and especially to means for counter-balancing the end thrust of such pumps.

The object of the invention is to provide a hydraulic end thrust counter-balance for vertical shaft centrifugal pumps which on account of the conditions of operation must be arranged some distance below the driving means.

Another object of the invention is to provide a vertical shaft centrifugal pump provided with a fixed balance and a variable balance for supporting the runner in proper alinement with the case.

In vertical shaft centrifugal pumps some means, other than mechanical bearings, must be employed to balance the weight of the runner, the shafting and the driving connections, in order to overcome excessive friction and wear. The pressure on opposite sides of the runner in the case is constantly varying, with the tendency to move the runner out of central alinement with the case and some means must also be provided for automatically counter-balancing such varying thrust in order to hold the runner in alinement.

Variable pressure counter-balance means have heretofore been arranged in vertical shaft centrifugal pumps to support the entire end thrust and to maintain the runner in central position but on account of the great weight which must be sustained in deep well pumps, the automatic balancing device has not been able to accomplish its function with efficiency. Under such conditions the area of the supporting piston must be comparatively large and a large amount of water is necessary to produce the operation of the balance. According to my invention, however, I provide a calculated or fixed balance which operates in conjunction with a variable balance. The calculated balance supports the greater percentage of the end thrust, allowing the variable balance to support the remainder of the thrust and to take care of the varying thrust due to the action of the driving mechanism or the unequal pressure caused by variations in the suction or variations in the discharge pressure. In this manner a greater thrust can be counterbalanced with greater efficiency than would be possible with a single variable pressure counter-balancing chamber, and the variable pressure balance is capable of finer adjustment so that it performs its function with greater efficiency.

The invention possesses other advantageous features, which, with the foregoing will be set forth at length in the following description, where I shall outline in full that form of the invention which I have selected for illustration in the drawings accompanying and forming part of the present specification. The novelty of the invention will be included in the claims succeeding said description. From this it will be apparent that I do not restrict myself to the showing made by such drawings and descriptions as I may adopt many variations within the scope of my invention as expressed in said claims.

Referring to the drawings:—Figure 1 is a vertical section of a vertical shaft centrifugal pump showing the arrangement of the two counter-balance chambers of my invention. Fig. 2 is a vertical section through a portion of the pump showing a modified form of the variable pressure counterbalance. Fig. 3 is a similar view showing another modification.

My invention is particularly adapted to be used in connection with vertical shaft centrifugal pumps and I have illustrated in the drawings, a simple or single stage vertical shaft pump, but it is to be understood that the invention is equally applicable to compound or multi-stage pumps. The pump consists of a case 2 having the usual involute chamber 3, suction inlets 4 and discharge outlet 5. Within the case 2 and attached to the vertical shaft 6 is a runner or impeller 7 arranged so that it lies substantially central of the case when the pump is in operation. A collar 8, secured to the shaft 6 supports the shaft and the runner when the pump is not in operation and is so placed that it is lifted out of contact with the upper part of the pump framing 9 when the pump is in operation.

The runner 7 is preferably provided on opposite sides with flanges 12—13 which form running joints with the case and hold the impeller alined. The flange 12 on the upper side of the runner forms a running joint with the case 2 and the flange 13 on the lower side forms a running joint with the bearing ring 14 secured to the case. This ring 14 is preferably formed separable from the pump casing, so that it may be readily removed when worn and a new ring inserted in its place. Attached to the plate 15, forming the lower part of the casing or to the ring 14 is a bottom plate 16 having a central cylindrical chamber 17 formed therein, into which the hollow cylindrical block 18 projects, forming a running joint therewith. This block 18 is attached to or formed integral with the flange 13 of the runner and affords a passage between the bottom of chamber 17 and the interior of the runner. The lengths of the flange 13, the flange 19 on the cylindrical block and the ring 14 are so proportioned that an annular chamber 21 is formed which is inclosed by the plate 16, the ring 14 and the block 18. Water under pressure enters this chamber through the running joint between the flange 13 and the ring 14 and is discharged therefrom through the running joint between the block 18 and the plate 16. The circumferential lengths of these joints being different it is evident that water under pressure is accumulated in chamber 21 and exerts an upward pressure against the runner. This arrangement is what is termed a calculated balance, the upward pressure depending upon the relative lengths of the two running joints and the area of the chamber. In practice I form this balance of such dimensions that it counter-balances substantially three-fourths of the end thrust, although this fraction may be varied as desired.

Arranged on the drive shaft 6, at any point thereof, and concentric therewith is a cylinder 22 in which is arranged the automatically operated counter-balancing means, which I have generally designed to counter-balance substantially one-fourth of the thrust and the variations in pressure. This cylinder 22 is preferably supported upon the pump casing at the suction inlet side, but may be arranged at any point on the shaft and supported by external means. Within this cylinder and securely attached to the shaft 6 is a piston 23 having a concentric plug 24 of smaller diameter formed thereon and projecting downward from the bottom. This plug seats in a chamber 25, and by its vertical movement controls the outlet to the variable pressure chamber 26. Water under pressure is supplied to the chamber 26 through the pipe 27 connected to the discharge 5. The pipe 27 is preferably provided with a valve 28, which may be adjusted to regulate the rate at which water enters the chamber 26 and consequently the pressure therein. When the pressure within the case becomes unbalanced and the runner is moved upward, the plug 24 is withdrawn from chamber 25, allowing the water in chamber 26 to discharge preferably through ports 29 into the suction, thereby reducing the counter-balancing pressure in chamber 26 and causing the runner to move downward to its central position. When the cylinder 22 is arranged at some point removed from the pump casing, the water may discharge to the atmosphere or to a conductor extending downward into the well. The chamber 25 may be provided with an upstanding flange 31, into which the plug 24 fits and which is provided with one or more apertures 32, the outlet through which is controlled by the plug. In such construction the plug is always seated within the ring and is not liable to be displaced as might occur in the construction shown in Fig. 3, wherein the plug is moved entirely out of the chamber 25.

As the pump is operating, water from the variable pressure chamber 26 passes upward through the running joint between the piston 23 and the cylinder 22 and enters the chamber 34, from which it must be discharged. This leakage water may be discharged through the external passage 35 connecting the chamber 34 with the suction 4 or it may be discharged through passages 35 in the plug 24 connecting the chamber with the chamber 25. In this construction, which is the preferable one, the piston 23 is formed with a recess 36 in its upper end into which the passages 35 open. The water leaking through the running joint, flows into the recess and downward into the pump, carrying with it all the sand which has passed through the joint. This arrangement removes all of the sand and thereby allows the piston 23 to work freely in the cylinder.

I claim:

1. In a vertical shaft centrifugal pump, the combination of a case, a runner mounted upon the shaft and revoluble within the case, a suction inlet passage concentric with the shaft upon one side of the case, an annular flange projecting from the runner into said inlet forming a running joint therein, a corresponding flange projecting from the opposite side of the runner, a chamber in the case into which said flange extends and is revoluble, a cylindrical block of smaller diameter than said flange attached thereto and bearing within the case forming an annular pressure chamber below the runner, inlet and outlet passages to said chamber, a cylinder concentric with the shaft above said suction inlet, a piston attached to the shaft and revoluble within said cylinder, a pipe connecting the chamber in said cylinder below the piston with the pump discharge.

and means operated by the vertical movement of the piston for controlling the outlet to said chamber and the pressure therein.

2. In a vertical shaft centrifugal pump, provided with a shaft adapted to be moved vertically, the combination of a case, a runner mounted upon the shaft and revoluble within the case, a suction inlet passage concentric with the shaft upon one side of the case, an annular pressure chamber in the case below said runner, inlet and outlet passages to said chamber, a cylinder mounted on the case above said suction inlet, a piston attached to the shaft and revoluble within said cylinder, a pipe connecting the chamber in the cylinder below the piston with the pump discharge, a valve in said pipe, an outlet to said chamber in the cylinder and means on said piston for controlling said outlet and the pressure in said chamber.

3. In a vertical shaft centrifugal pump, the combination of a case, a runner mounted upon the shaft and revoluble within the case, a suction inlet passage concentric with the shaft upon one side of the case, a chamber in the case opposite the suction inlet, a flange in the runner extending into and revoluble within said chamber, a hollow cylindrical block of lesser diameter than said flange attached thereto and projecting into a correspondingly smaller chamber, an annular chamber between said block and the casing adjacent the discharge passage, the chamber being in constant communication with said discharge and the interior of the runner, a cylinder mounted on said casing above the suction inlet, a piston attached to the shaft and revoluble in said cylinder, a pipe connecting the chamber in the cylinder below the piston with the pump discharge, a valve in said pipe, an outlet passage for said chamber, a plug attached to said piston for controlling said passage, and a passage connecting the chamber above the piston with the suction inlet.

4. In a vertical shaft centrifugal pump, the combination of a case, a runner mounted upon a shaft and revoluble within the case, a chamber in said case below the runner into which the central part of said runner extends, said chamber being in constant communication with the pressure area within the case and the interior of the runner, a cylinder on said case above the suction inlet, a piston in said cylinder attached to the shaft and revoluble within said cylinder, a pipe connecting the chamber in the cylinder below the piston with the pump discharge, means for regulating the flow of water through said pipe and a plug attached to said piston for controlling the outlet to said chamber and the pressure therein.

In testimony whereof, I have hereunto set my hand at San Francisco, Cal., this 19th day of December, 1911.

JOHN A. YEATMAN.

In presence of—
  H. G. PROST,
  R. HEFFERNAN.